Patented Dec. 5, 1939

2,181,942

UNITED STATES PATENT OFFICE 2,181,942

POLYMERIZATION OF OLEFINS

Vladimir N. Ipatieff and Herman Pines, Chicago, Ill., assignors to Universal Oil Products Company, Chicago, Ill., a corporation of Delaware No Drawing. Application February 7, 1938, Serial No. 189,279

6 Claims. (Cl. 196—10)

This invention relates particularly to a process for the polymerization of normally gaseous olefins and in a still more limited sense is concerned with a method for effecting the formation of polymers of propylene using a catalyst which has heretofore been ineffective for this purpose.

The normally gaseous olefins comprising ethylene, propylene, and butylenes which are present as components of various byproduct gases in processes involving the destructive distillation of hydrocarbon materials such as coal and petroleum are chemically active by virtue of their unsaturation and are used as raw materials in the formation of numerous hydrocarbon derivatives. In the gaseous mixtures produced in oil cracking processes aimed principally at the production of maximum yields of gasoline, these olefins are present in relatively large proportions, the per cent of ethylene usually equalling approximately the combined percentages of propylene and butylenes. The three and four carbon atom compounds are commonly subjected to polymerization in oil refineries to produce liquid olefinic polymers which have high antiknock blending value, the processes employed being in some instances thermal and in other instances catalytic wherein lower temperatures and pressures are generally employed. It is current practice to operate upon the so-called propane-butane fractions comprising propane, propylene, butanes and butylenes which are produced as overhead from cracking plant stabilizers and high antiknock value octanes are also produced by starting with a mixture produced by further fractionation of said propane-butane fractions which comprise principally the butanes and butylenes.

Of the two, three, and four carbon atom olefin hydrocarbons, the last named are the most readily polymerized and the tendency to polymerize under comparable conditions of operation when giving due weight to temperature, pressure, time, and catalytic effect decreases as the molecular weight decreases so that propylene is less readily polymerized than the butylenes and ethylene is again less readily polymerized than propylene.

When considering catalytic processes for effecting the formation of liquid polymers from the gaseous olefins, it was natural from the petroleum refiners' standpoint to consider the use of sulfuric acid, since this reagent is in common use for treating purposes in the oil refining industry, but it was found that when attempts were made to polymerize propylene with sulfuric acid of different strengths and under varying conditions, stable iso-propyl esters were formed which would not undergo further decomposition to release active propylene molecules whose union would cause the formation of propylene polymers, and it is with the process for more effectively utilizing the propylene content of olefin-containing gases that the present invention is concerned.

In one specific embodiment the present invention comprises a process for the formation of liquid gasoline boiling-range polymers from propylene which comprises subjecting proportioned mixtures of propylene and butylenes to contact with relatively concentrated sulfuric acid at subatmospheric temperatures.

According to the present invention propylene, alone or in admixture with propane or other inert gases, is mixed with butylenes (which may also be diluted with the corresponding butanes) so that the molal ratio of propylene and butylenes is approximately unity and the mixture is subjected to the action of minor proportions by weight of sulfuric acid of over 90% concentration to form normally liquid products which consist of simple polymers of propylene, mixed polymers of propylene and butylenes, and minor proportions of butylene polymers. The important points to be observed are that the molal ratio of propylene to butylenes is less than 3:1 and that the weight proportion of sulfuric acid used is kept below a critical amount which in the case of continuous operations should be less than 50 and preferably less than 35% of the weight of the olefins involved in the polymerization. In general low temperatures are preferred of the order of 0° C. Under these selected conditions it has been shown by experiments, the results of which will be introduced later, that propylene is effectively polymerized by sulfuric acid of the concentrations usually utilized for treating in oil refineries so that the process possesses a practical value.

While the actual results obtained and not the theories of reaction mechanisms are relied upon to support the present invention, it may be suggested that the introduction of a more reactive olefin such as normal or iso-butylene into a reaction involving propylene and sulfuric acid has the effect of activating the propylene by the excess of energy released in the polymerization of the butylene, this activation resulting not only in the simple polymerization of the propylene rather than the formation of the stable esters already referred to but also causing the mixed polymerization of propylene with the butylene. The concentration and proportioning of acid employed is also definitely influential in the process, probably on account of the limited solution effect offered by the strong acid in the quantities specified. As a rule the greater activation effect is observed when utilizing the more reactive isobutylene than when using normal butylenes.

Experiments have also indicated that the polymerization of propylene in the presence of the more reactive olefins can be brought about for a limited time by the mono-iso-propyl ester of sulfuric acid which may possibly indicate that the primarily formed mono ester is the essential catalyst of the polymerization reactions. This fact is substantiated to some extent (as will be shown in a later numerical section) by the fact that the di-iso-propyl ester has substantially no catalytic activity in the reaction which would correspond to complete replacement of the hydrogen atoms in the sulfuric acid.

The present process may be applied to the formation of liquid polymers of propylene from any source such as for example that produced by the dehydration of propyl alcohols, but it finds its broadest application in the treatment of hydrocarbon fractions relatively high in propylene which are produced incidental to petroleum cracking and the utilization of the gaseous by-products. For example, the propane-butane fractions produced as stabilizer overhead in cracking plants may be first treated to attain the proper proportions of propylene and butylenes and then subjected to contact at low temperatures with sulfuric acid to produce maximum yields of gasoline boiling range polymers which will comprise substantial and usually major proportions of heptenes which boil within the lower ranges of ordinary gasoline.

The process may be operated either according to batch or continuous procedures. In a simple batch operation the proper amount of sulfuric acid is placed in a treating chamber, cooled to approximately 0° C. and a liquefied mixture of hydrocarbons containing the approximate equimolecular proportions of propene and butenes is gradually introduced during vigorous agitation of the acid to insure intimate contact of the hydrocarbons. After the proper amount of hydrocarbon mixture in respect to the acid has been added, the process is stopped, the acid allowed to settle, and the hydrocarbon layer is drawn off and neutralized and may be distilled to recover separate fractions or to produce a cut of a definite boiling range which can be used as a blending agent for low antiknock motor fuels.

In continuous operations cooled streams of acid and hydrocarbons may be admitted to mixing devices and maintained in intimate admixture for a suitable period of time after which the products pass into settling tanks from which the acid and hydrocarbon layers are separately recovered. This operation is obviously the best from a practical standpoint and it is the one most generally used.

The following experimental data is introduced to assist in defining the character of the invention and showing the basis for the limitations noted in the foregoing description of the process although not with the intention of unduly limiting its scope.

The data shown in the tabulation below was obtained in a series of batch operations in which the proposed mixtures of propylene and iso-butylene were slowly added to vigorously agitated sulfuric acid maintained at a temperature of approximately +2° C.

| Experiment No. | Mixture $C_3H_6$+ i—$C_4H_8$ | | Ratio $C_3H_6$: i—$C_4H_8$, moles | Sulfuric acid (96%) grams | Ratio of gases to $H_2SO_4$ (by weight) used |
|---|---|---|---|---|---|
| | Liq., cc. | Grams | | | |
| 1 | 300 | 162 | 40:60 | 274 | 1:1.7 |
| 2 | 200 | 105 | 50:50 | 183 | 1:1.74 |
| 3 | 500 | 264 | 50:50 | 91 | 1:0.35 |
| 4 | 400 | 212 | 73:27 | 183 | 1:0.87 |
| 5 | 360 | 186 | 75:25 | 91 | 1:0.48 |
| 6 | 385 | 196 | 91:9 | 183 | 1:0.93 |
| 7* | 200 | 106 | 46:54 | 183 | 1:1.72 |

*n-Butene was used.

| Experiment No. | After reaction | | | |
|---|---|---|---|---|
| | $H_2SO_4$ layer, grams | Hydrocarbon layer, grams | Propylene polymer, grams | Percent of total propylene which polymerized |
| 1 | 325 | 111 | 36 | 38 |
| 2 | 214 | 76 | 16 | 35 |
| 3 | 123 | 219 | 69 | 60 |
| 4 | 274 | 103 | 37 | 25 |
| 5 | 145 | 104 | 38 | 32 |
| 6 | 352 | 15 | 0 | 0 |
| 7* | 238 | 51 | 0 | 0 |

*n-Butene was used.

The above data show that the best results in the production of propylene polymers was obtained with an equimolecular ratio of propylene and iso-butylene and an amount of acid equal to 35% by weight of the hydrocarbon mixture (experiment 3). It is also shown by experiments 4 and 5 that a considerable amount of propylene is polymerized when the amount of iso-butylene used is only one-third mole of the propylene. Experiments 6 and 7 indicate respectively that with a 10:1 molal ratio of propylene to iso-butylene no propylene polymerized when the amount of acid employed was 93% by weight of the hydrocarbons and that even with an approximately equal ratio of propylene to iso-butylene there was no formation of propylene polymer when the weight of acid employed was 70% greater than the weight of hydrocarbons.

The following data shows significant results obtained when employing various sulfuric acid esters alone and mixed with free sulfuric acid in polymerizing isobutylene mixtures of propylene and iso-butylene, using temperatures of the order of 0° C. to normal atmospheric and a batch operation wherein the mixture of hydrocarbons was gradually added to the liquid catalyst.

| Experiment No. | Catalyst | Charge | | Hydrocarbon layer before distillation grams | Heptenes (percent boiling to 90°) | Octenes (percent boiling 90–125°) |
|---|---|---|---|---|---|---|
| | | $C_3H_6$ grams | i—$C_4H_8$ grams | | | |
| 1 | Di-iso-propylsulfate | 0 | 112 | 123 | | |
| 2 | $Et_2SO_4$, 77 grams. $H_2SO_4$, 1.2 grams | 0 | 45 | 37.5 | | 25 |
| 3 | Mono-isopropylsulfate: $C_3H_6$, 43 grams. $H_2SO_4$ (96%), 91 grams | 75 | 108 | 158 | 14.2 | 8.7 |
| 4 | Di-isopropylsulfate: $C_3H_6$, 77 grams. $H_2SO_4$ (96%), 91 grams | 74 | 131 | 151.5 | 7.2 | 7.2 |
| 5 | Di-isopropylsulfate: $C_3H_6$, 77 grams. $H_2SO_4$ (96%), 91 grams | 104 | 138 | 160 | 2.8 | 4.5 |

Several significant facts can be seen from the above data. In experiment 1 no polymerization of the ordinarily readily polymerizable iso-butylene was obtained when employing di-isopropyl sulfate catalyst. Experiment 2 indicates that a slightly acid ethyl sulfate was able to effect the formation of a considerable amount of octenes from iso-butylene. Experiment 3 shows that mono-isopropylsulfate was able to effect a limited polymerization of propylene in the presence of iso-butylene to form definite amounts of heptenes resulting from the mixed polymerization of the two olefins. Experiment 4 shows that even in the presence of a larger proportion of iso-butylene there was less formation of mixed polymers when di-isopropyl-sulfate was employed as a catalyst while there was some formation of an octene fraction. Experiment 5 indicates the production of low yields of heptenes and octenes when employing a larger proportion of both propylene and iso-butylene.

We claim as our invention:

1. A process for producing gasoline boiling hydrocarbons from butylene which comprises forming a mixture of propylene and butylene in which the molal ratio of propylene to butylene is less than 3 to 1, and subjecting the mixture at subatmospheric temperature to the action of sulfuric acid of over 90% concentration.

2. A process for producing gasoline boiling hydrocarbons from propylene which comprises forming a mixture of propylene and butylene in which the molal ratio of propylene to butylene is less than 3 to 1, and subjecting the mixture at subatmospheric temperature to the action of a minor proportion by weight of sulfuric acid of over 90% concentration.

3. A process for producing gasoline boiling hydrocarbons from propylene which comprises forming a mixture of propylene and butylene in which the molal ratio of propylene to butylene is less than 3 to 1, and subjecting the mixture at a temperature of the order of about 0° C. to the action of a minor proportion by weight of sulfuric acid of over 90% concentration.

4. A process for producing gasoline boiling hydrocarbons from propylene which comprises forming an approximately equimolecular mixture of propylene and butylene, and subjecting the mixture at subatmospheric temperature to the action of sulfuric acid of over 90% concentration.

5. A process for producing gasoline boiling hydrocarbons from propylene which comprises forming an approximately equimolecular mixture of propylene and butylene, and subjecting the mixture at subatmospheric temperature to the action of sulfuric acid of over 90% concentration, the amount of the acid being 35% or less by weight of the propylene-butylene mixture.

6. A process for producing gasoline boiling hydrocarbons from propylene which comprises forming an approximately equimolecular mixture of propylene and butylene, and subjecting the mixture at a temperature of the order of about 0° C. to the action of sulfuric acid of over 90% concentration, the amount of the acid being 35% or less by weight of the propylene-butylene mixture.

VLADIMIR N. IPATIEFF.
HERMAN PINES.